Nov. 1, 1938.  O. OTTOSON  2,135,410

TEAPOT

Filed May 22, 1937

Inventor

Oscar Ottoson.

By Lacey&Lacey

Attorneys

Patented Nov. 1, 1938

2,135,410

UNITED STATES PATENT OFFICE 2,135,410

TEAPOT

Oscar Ottoson, New York, N. Y.

Application May 22, 1937, Serial No. 144,270

3 Claims. (Cl. 53—3)

This invention relates to a teapot and one object of the invention is to provide a device of this character so constructed that it will be divided into separate compartments, one for tea and the other for hot water and thus permit the same teapot to be used for holding tea and hot water. It will thus be seen that, when serving tea, tea may be first poured from the teapot and if the tea is too strong hot water may then be poured from the teapot into the partially filled cup and dilute the tea in the cup.

Another object of the invention is to provide a teapot wherein the tea and the hot water will be poured from the compartment through separate spouts, each having communication with one of the compartments, the spouts being disposed at opposite sides of the body portion of the teapot so that either tea or hot water may be dispensed without likelihood of one being accidentally dispensed along with the other.

Another object of the invention is to so form the partition between the tea and water compartment that filling of the water compartment will be limited and surplus water caused to flow into the tea compartment in case too much water should be accidentally poured into the water compartment or the teapot tilted beyond a normal extent while dispensing tea through the spout of the tea compartment.

It is another object of the invention to provide baffles at upper ends of the two compartments, thus preventing likelihood of tea or water being spilled while pouring one or the other from the teapot.

Another object of the invention is to provide a device of this character which may be formed from earthenware and of a unitary construction except for the removable cover which will also be preferably formed of earthenware.

The invention is illustrated in the accompanying drawing, wherein—

Figure 1:
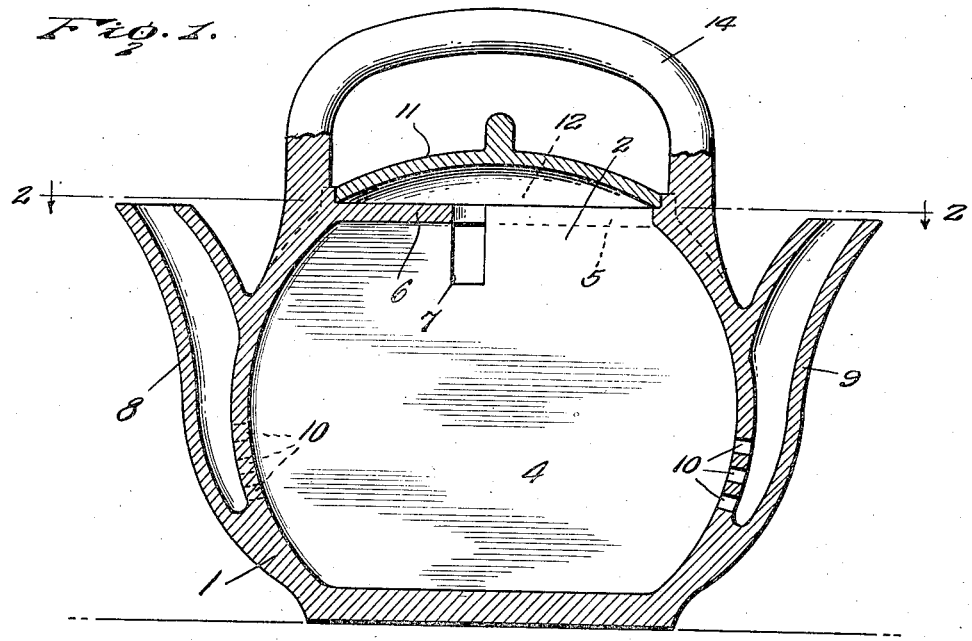
Figure 1 is a view taken vertically through the improved teapot.
Figure 2:
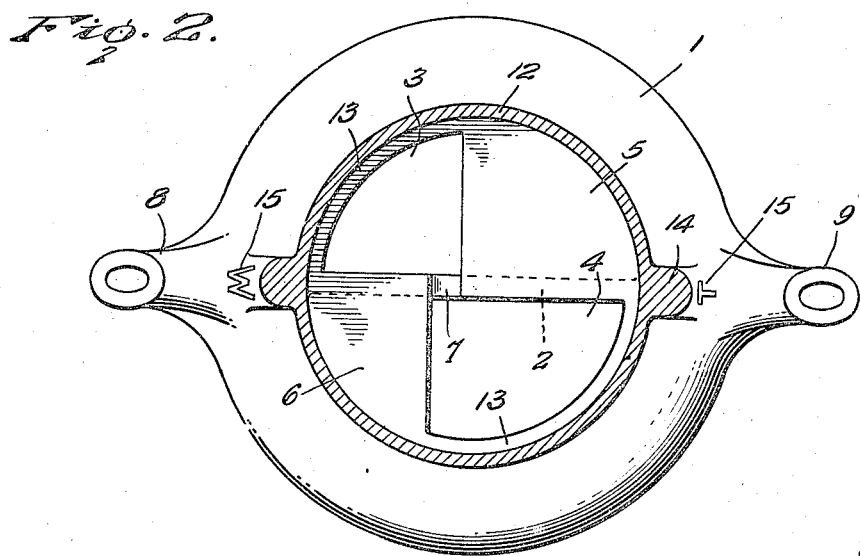
Figure 2 is a view taken along the line 2—2 of Figure 1.

The teapot constituting the subject-matter of this invention is preferably formed of earthenware and has a body 1 which may be of any dimensions desired. While the teapot has been shown substantially circular in cross section, it is to be understood that it may be of any outline desired. A partition 2 extends vertically in the body diametrically thereof, as shown in Figure 2, to divide the interior of the body into a water compartment 3 and a tea compartment 4. Partial closures 5 and 6 are provided for upper ends of the compartments 3 and 4, and it should be noted that the closure 5 is of greater length than the closure 6, as shown in Figure 2, thus providing the water compartment with a filling opening at its top which is smaller than the filling opening for the tea compartment. The filling opening for the tea compartment is formed larger than the filling opening for the water compartment in order that tea leaves may be easily passed into the tea compartment or washed out of the same. This also permits a tea ball to be easily inserted or removed from the tea compartment. The closures 5 and 6 terminate in spaced relation to each other and between them the partition is formed with a slot or recess 7 which extends vertically from the upper edge of the partition 2. Spouts 8 and 9 extend from opposite portions of the body with the partition 2 extending between them, and upon referring to Figure 1, will be seen that each of these spouts communicate with the interior of the teapot through openings 10 formed through the wall of the teapot, the spout 8 being in communication with the water compartment and the spout 9 being in communication with the tea compartment. A cover 11 which is also preferably formed of crockery fits within the neck 12 of the teapot and rests upon the closures 5 and 6 and also upon marginal flanges 13 extending about the outer marginal edges of the filling opening for the compartment. There has also been provided a handle 14 which may be formed integral with the body portion of the teapot or formed separate therefrom and loosely connected with the teapot at opposite sides of the neck so that it may be swung downwardly to one side of the teapot when it is not in use. The letters "W" and "T" may be marked upon the teapot between the spouts and the ends of the handle, as shown at 15, to designate which spout is to be used when pouring tea or water. The spouts are of such height that their upper ends terminate substantially flush with the plane of the upper surfaces of the closures 5 and 6, as shown in Figure 1, and the teapot can, therefore, not be filled to such an extent that the tea or water will flow out of the spout when the teapot is in the upright position.

When this teapot is in use, tea is made in the compartment 4 and a supply of hot water is poured into the compartment 3 and the cover set in place. After the tea has steeped a sufficient length of time, the teapot may be grasped by its handle which extends between the spouts diametrically of the body portion of the teapot and the teapot tilted to pour from the compartment 4 and through the spout 9 into a tea cup. If it is found that the tea is too strong, it is merely necessary to reverse the teapot or move it slightly and then tilt it in a direction to cause water to pour through the spout 8 and into the cup. The fact that the closure 5 is of greater size than the closure 6 will permit the teapot to be tilted in a direction to pour tea through the spout 9 without likelihood of accidentally spilling water from the compartment 5, and attention is called to the fact that in case the teapot is tilted more than necessary to cause tea to flow from the spout 9 water in the compartment 3 instead of spilling over the closure 5 will flow through the slot or recess 7 and into the tea compartment where it will mix with the tea. This will not be objectionable as sufficient water will not flow into the tea compartment to cause the tea to be unduly weakened. When the teapot is to be washed, it is merely necessary to remove the cover and the water and tea can then be easily poured out of the teapot and all tea leaves thoroughly washed out of the tea compartment.

Having thus described the invention, what is claimed as new is:

1. A teapot comprising a body open at its top and having spouts extending from its opposite side portion, a partition extending vertically in the body diametrically thereof between the spouts, walls of the body being formed with discharge openings establishing communication between the spouts and companion compartments defined by the partition, partial closures for the upper ends of the compartments extending longitudinally of the upper edge of the partition, the closure for one compartment being of greater length than the other and the partition having a portion exposed between adjacent ends of the closures and formed with a recess extending downwardly from its upper edge, and a cover for the teapot.

2. A teapot comprising a body open at its top, spouts extending from opposite sides of the body, a partition disposed vertically in the body diametrically thereof between the spout and defining compartments each having one of the spouts communicating with an end portion thereof, a cover for the upper end of the body, closures for the last-mentioned end portions of said compartments having adjacent ends spaced from each other, the portion of the partition between the closures being formed with a recess leading from its upper end, and a handle carried by the body in bridging relation to the open top thereof and having its ends connected with the body over the spout whereby the handle may be grasped and the body tilted in either direction to pour liquid through a spout.

3. A teapot comprising a body having pouring spouts extending from opposite sides thereof, a vertical partition in the body between the spouts and defining a tea compartment and a water compartment, openings being formed in the walls of the body to establish communication between the compartments and the spouts, baffles forming partial closures for the compartments and extending along the partition from opposite ends thereof towards each other, the partition being formed with an overflow passage leading from its upper end between the baffles, and a removable cover for the body.

OSCAR OTTOSON.